US012580208B2

(12) United States Patent
Schenk et al.

(10) Patent No.: US 12,580,208 B2
(45) Date of Patent: Mar. 17, 2026

(54) METHOD AND CIRCUIT ARRANGEMENT FOR SETTING AN INJECTION STRATEGY FOR AN INJECTOR OF A FUEL CELL SYSTEM

(71) Applicant: AVL List GmbH, Graz (AT)

(72) Inventors: Alexander Schenk, Köflach (AT); Stefan Trojer, Leisach (AT); Markus Kogler, Lieboch (AT)

(73) Assignee: AVL List GmbH, Graz (AT)

( * ) Notice: Subject to any disclaimer, the term of this patent is extended or adjusted under 35 U.S.C. 154(b) by 1196 days.

(21) Appl. No.: 17/428,645

(22) PCT Filed: Feb. 7, 2020

(86) PCT No.: PCT/AT2020/060036
§ 371 (c)(1),
(2) Date: Aug. 5, 2021

(87) PCT Pub. No.: WO2020/160584
PCT Pub. Date: Aug. 13, 2020

(65) Prior Publication Data
US 2022/0123331 A1     Apr. 21, 2022

(30) Foreign Application Priority Data
Feb. 8, 2019    (AT) .............................. A 50098/2019

(51) Int. Cl.
*H01M 8/04089*     (2016.01)
*H01M 8/0438*     (2016.01)
*H01M 8/04746*     (2016.01)
(52) U.S. Cl.
CPC ... *H01M 8/04089* (2013.01); *H01M 8/04388* (2013.01); *H01M 8/04753* (2013.01)

(58) Field of Classification Search
CPC ......... H01M 8/04089; H01M 8/04104; H01M 8/04388; H01M 8/04402; H01M 8/04753; H01M 8/04761
See application file for complete search history.

(56) References Cited

U.S. PATENT DOCUMENTS

| | | | |
|---|---|---|---|
| 2006/0024548 A1 | 2/2006 | Pechtold et al. | |
| 2009/0130510 A1 | 5/2009 | Ishikawa et al. | |
| 2011/0143234 A1* | 6/2011 | Senner .............. | H01M 8/04753 429/416 |
| 2012/0064425 A1 | 3/2012 | Mitsui et al. | |

FOREIGN PATENT DOCUMENTS

| | | |
|---|---|---|
| CN | 101331639 | 12/2008 |
| CN | 102097633 | 6/2011 |
| DE | 112006003292 | 10/2008 |
| DE | 102010052910 | 7/2011 |

* cited by examiner

*Primary Examiner* — Raymond Alejandro

(57) ABSTRACT

A method for setting an injection strategy for an injector (1) by way of PWM signals in order to inject fuel in a fuel cell system (2), has the steps of: setting an injection frequency to a predefinable first value within a predefinable value range with a predefinable pulse duration in the PWM signal using a setting unit (3), and adjusting the injection frequency to a predefinable second value, different from the first value, within the predefinable value range using an adjustment unit (4), wherein the pulse duration of the PWM signal is kept constant in order to change a duty cycle of the PWM signal of the injection strategy. A corresponding circuit arrangement (8), a fuel cell system (2) and a computer program (9) are also described herein.

3 Claims, 2 Drawing Sheets

METHOD AND CIRCUIT ARRANGEMENT FOR SETTING AN INJECTION STRATEGY FOR AN INJECTOR OF A FUEL CELL SYSTEM

RELATED APPLICATIONS

This application is a National Phase of PCT Patent Application No. PCT/AT2020/060036 having International filing date of Feb. 7, 2020, which claims the benefit of priority of Austrian Patent Application No. A50098/2019 filed on Feb. 8, 2019. The contents of the above applications are all incorporated by reference as if fully set forth herein in their entirety.

FIELD AND BACKGROUND OF THE INVENTION

The present invention relates to a method and a circuit arrangement for setting an injection strategy for an injector by way of PWM signals in order to inject fuel in a fuel cell system. The invention further relates to a correspondingly configured computer program.

Injection systems with injectors are known in the prior art, in particular in the form of injector nozzles in internal combustion engines. In these cases, injectors are usually controlled depending on a motion path of a crankshaft of the internal combustion engine, that is to say the injection strategy of an injector is set in the internal combustion engine on the basis of a time-based pulse width modulated (PWM) control signal depending on the position of the crankshaft.

In fuel cell systems, injectors are also used for fuel injection. One advantage of fuel injection in fuel cell systems is that moving parts such as the crankshaft do not need to be taken into consideration. However, the technical field of setting injection strategies in fuel cell systems is still relatively new compared to setting systems in internal combustion engines. Accordingly, solutions to various problems in the setting of injection strategies for injectors in fuel cell systems are currently still frequently being sought. In particular, work is always being conducted on improved systems for the adaptive control of fuel injectors depending on pressure differences in a fuel cell stack of the fuel cell system.

SUMMARY OF THE INEVNTION

The object of the present invention is to take into account, at least in part, the problems described above. In particular, it is the object of the present invention to create an improved method as well as a correspondingly improved circuit arrangement for setting an injection strategy for an injector of a fuel cell system in order to inject fuel in the fuel cell system.

In addition, one object is to provide a fuel cell system and a computer program product for the advantageous setting of the injection strategy for an injector by way of PWM signals in order to inject fuel in a fuel cell system.

The above object is achieved by the claims. In particular, the above object is achieved by the method according to claim 1, the circuit arrangement according to the current invention, the fuel cell system according to the current invention and the computer program according to the current invention. Further advantages of the invention are set forth in the dependent claims, the description and the drawings. Naturally, features and details which are described in connection with the method also apply in connection with the circuit arrangement according to the invention, the fuel cell system according to the invention, the computer program according to the invention and vice versa, so that with regard to disclosure mutual reference is, or can, always be made to the individual aspects of invention.

According to a first aspect of the present invention, a method is provided for setting an injection strategy for an injector by way of PWM signals in order to inject fuel in a fuel cell system. The method has the following steps:

setting an injection frequency to a predefinable first value within a predefinable value range with a predefinable pulse duration in the PWM signal using a setting unit, adjusting the injection frequency to a predefinable second value, different from the first value, within the predefinable value range using an adjusting unit, wherein the pulse duration of the PWM signal is kept constant in order to change a duty cycle of the PWM signal of the injection strategy.

In terms of the present invention, setting the injection frequency to a first value and adjusting the injection frequency to a second value is to be understood to mean a targeted variation of the duty cycle. In a PWM signal, a period duration is divided into a first time interval with pulse and a second time interval without pulse. The duty cycle is to be understood to mean the ratio of the pulse duration to the total period duration, i.e. the sum of the time intervals with and without pulse. For example, if the duty cycle is 0.5, the duration with pulse and the duration without pulse are the same length.

According to the invention, the injection frequency and thus the duty cycle of the controlling PWM signal is to be adjusted. It is thereby a requirement that the pulse duration be kept constant. Due to the relationship described, with a constant pulse duration the period duration is therefore changed in order to change the duty cycle. In comparison to known solutions, the adjustment step can be carried out more simply, more cost-effectively and above all much faster in this way, since the pulse duration and thus the time interval for the activation of the injector is kept constant. The mechanical load on the injector also remains the same for all injection frequencies, since the injection duration does not change, only the pause times between the injections.

According to the invention, only the pauses between the injections are varied, so that with a constant pulse duration different period durations, and in this way in effect different duty cycles, result. The resulting duty cycle of the PWM signal results, in its effect on the injector, in the desired adjusted injection frequency. According to the invention, a PWM signal is in particular a binary or substantially binary signal in the form of a square wave signal.

In comparison to known solutions, the width of the PWM signal is thus modulated exclusively through variation of the period duration at a constant pulse duration. The time interval without pulse is thereby used as a modulation variable for the period duration, while a modulation of the pulse duration, i.e. the time interval without pulse, is avoided.

The control method according to the invention allows the fuel injection in the fuel cell system to be adapted quickly and simply to the given operating parameters in the fuel cell system. As a result, an excessively high fuel consumption and operation with insufficient fuel can be prevented. In particular, undesirable mechanical stresses or corresponding forces in the fuel cell system can be prevented through the quick and simple adaptation of the fuel injection, for example to different pressures in the electrode region of a fuel cell stack of the fuel cell system.

The present invention relates in particular to PEM fuel cell systems. That is to say, a method for setting an injection strategy for an injector by way of PWM signals in order to inject fuel in a PEM fuel cell system is preferably provided. PWM signal means a pulse width modulated signal.

The injection strategy is understood to mean the manner in which fuel is, over time, injected in the fuel cell system with the aid of the injector, into at least one functional component or into at least one functional section of the fuel cell system. Such a functional section may be an anode gas supply section for supplying a fuel-containing anode gas to an anode section of a fuel cell stack of the fuel cell system.

In a fuel cell system, the pressure in or at an anode section of the fuel cell stack should follow the pressure in or at a cathode section of the fuel cell stack. This should also be carried out as quickly as possible in order to prevent mechanical stresses on or in the fuel cell membrane. With the help of the proposed method, a fast and effective control strategy can be provided which achieves this object.

The injector can be designed as a jet pump, injection nozzle or corresponding device for introducing and/or mixing liquids and/or gases, in particular fuel, in a functional section of the fuel cell system.

By changing the injection frequency while the pulse duration remains the same, the duty cycle changes accordingly, i.e. the injection frequency is preferably changed while the pulse duration or on-time remains the same, resulting in a changed duty cycle.

The injection frequency is preferably set to a predefinable first value within a predefinable value range with a predefinable pulse duration and/or with a predefinable duty cycle in the PWM signal using the setting unit.

It can be advantageous if, in a method for adjusting the injection frequency according to the invention, at least one operating parameter of the fuel cell system is determined which is taken into consideration in the quality and/or in the quantity of the adjustment of the injection frequency. As will be explained later, such a parameter can for example be a pressure value in a line section of the fuel cell system. This can for example be the anode section. In other words, such an operating parameter can specify the direction of the adjustment and/or the degree of the adjustment or can be taken into consideration accordingly in the adjustment.

According to a further aspect of the present invention, it is possible that, in a method, the injection frequency is set or adjusted to a value between 0.2 Hz and 30 Hz. In various experiments conducted in connection with the present invention, i.e. using the proposed method, these injection frequencies have proved to be particularly advantageous. At an injection frequency of for example 30 Hz, the duty cycle can be 50% or can be set accordingly. This leads to a pulse duration or an on-time of approx. 17 ms. If the injection frequency is now reduced, on the basis of the PWM signal, to 0.2 Hz for example, the pulse duration remains as constant as possible and the duty cycle is reduced accordingly to 0.34%. In principle, however, it can be advantageous if, in a method, the injection frequency is set or adjusted to any desired predetermined value.

Furthermore, it is possible that in a method according to the present invention the fuel cell system comprises at least one fuel cell stack with an anode section and a cathode section and the method has the following steps:

determining a current pressure value in the anode section using a determining unit, generating a difference value between the current pressure value and a setpoint value using a generating unit, and adjusting the injection frequency on the basis of the generated difference value using the adjusting unit.

That is to say, within the framework of the method a regulation or control error is determined as a difference value between the desired anode pressure and a current, actual anode pressure. This allows a desired injection frequency or a corresponding PWM signal to be determined or calculated quickly, simply and reliably.

In addition, in a method according to the invention it is possible that, for the PWM signal, when setting the injection frequency to the first value, a predefinable duty cycle is selected using a selection unit on the basis of a lookup table. In particular, the setting is carried out automatically. The duty cycle or the ratio between pulse duration and period duration, in particular with respect to the determined injection frequency, is selected by means of the lookup table. With the help of the lookup table, the duty cycle can in the present case be determined particularly quickly and easily with reference to the injection frequency.

According to a further aspect of the present invention, a circuit arrangement for setting an injection strategy for an injector by way of PWM signals in order to inject fuel in a fuel cell system is proposed. The circuit arrangement comprises:

a setting unit for setting an injection frequency to a predefinable first value within a predefinable value range with a predefinable pulse duration in the PWM signal, and an adjusting unit for adjusting the injection frequency to a predefinable second value, different from the first value, within the predefinable value range, wherein the pulse duration of the PWM signal is kept constant in order to change a duty cycle of the PWM signal of the injection strategy.

Thus, a circuit arrangement according to the invention brings the same advantages as have been described in detail with reference to the method according to the invention. The setting unit and the adjusting unit are preferably provided in the form of software and/or hardware components in a suitable control device and/or in a processor unit.

As described above with reference to the method, the setting unit and the adjusting unit are configured to set or adjust the injection frequency to a value between 0.2 Hz and 30 Hz or between a minimum value and a maximum value, or between other values. That is to say, the setting unit can be configured to set the injection frequency or the associated PWM signal to a maximum value of 30 Hz and the adjusting unit can be configured to adjust the injection frequency or the associated PWM signal from 30 Hz to a minimum value of for example 0.2 Hz. The method can be carried out accordingly.

In addition, in a circuit arrangement according to the invention it is possible that the fuel cell system comprises at least one fuel cell stack with an anode section and a cathode section and the circuit arrangement further comprises:

a determining unit for determining a current pressure value in the anode section, and a generating unit for generating a difference value between the current pressure value and a setpoint value, wherein the adjusting unit is configured to adjust the injection frequency on the basis of the generated difference value.

In order to set the PWM signal to the injection frequency with the first value, a selection unit can be provided in order to select or set a predefinable duty cycle on the basis of a lookup table.

According to a further aspect of the present invention, a fuel cell system, in particular a PEM fuel cell system, with a circuit arrangement as described above for setting an injection strategy for an injector by way of PWM signals in order to inject fuel in the fuel cell system, is provided. For this purpose, according to the invention a computer program is proposed which comprises commands which, when the computer program is run on a computer, causes said computer to carry out the method explained in detail above. Thus, a fuel cell system according to the invention and the computer program also bring the advantages described above.

The computer program can be implemented as a computer-readable instruction code in any suitable programming language such as Matlab/Simulink, JAVA, C++and/or C#. The computer program can be stored on a computer-readable storage medium such as a data disk, a removable drive, a volatile or non-volatile memory or a built-in memory/processor. The instruction code can program a computer or other programmable devices, such as a control device, in such a way that the desired functions are executed. The computer program can also be provided in a network, for example the internet, from which it can be downloaded by a user as necessary. The computer program can be realised both by means of software as well as by means of one or more special electronic circuits, i.e. in hardware or in any hybrid form, i.e. by means of software components and hardware components.

BRIEF DESCRIPTION OF THE SEVERAL VIEWS OF THE DRAWINGS

Further measures improving the invention are explained in the following description of different exemplary embodiments of the invention which are represented schematically in the figures. All features and/or advantages disclosed in the claims, the description or the figures, including constructive details and spatial arrangements, may be essential to the invention both in themselves and in the various combinations.

In each case schematically.

DESCRIPTION OF SPECIFIC EMBODIMENTS OF THE INVENTION

Figure 1:
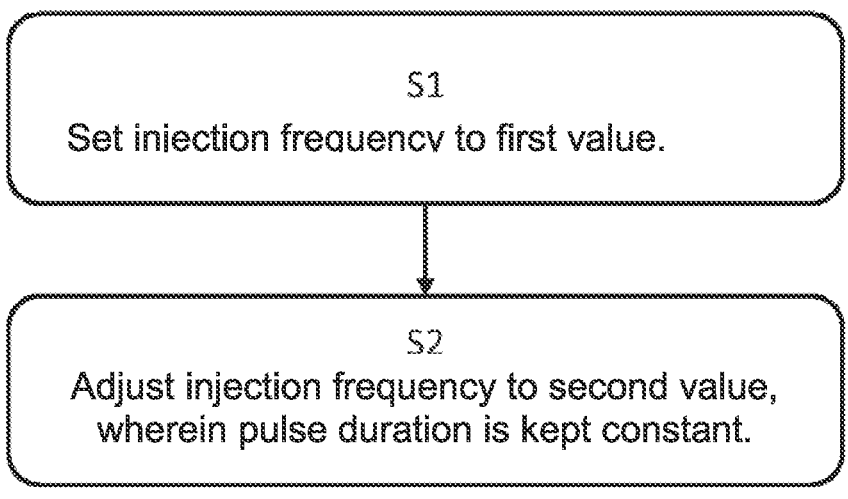
FIG. 1 shows a flowchart explaining a method according to an embodiment of the present invention.
Figure 2:
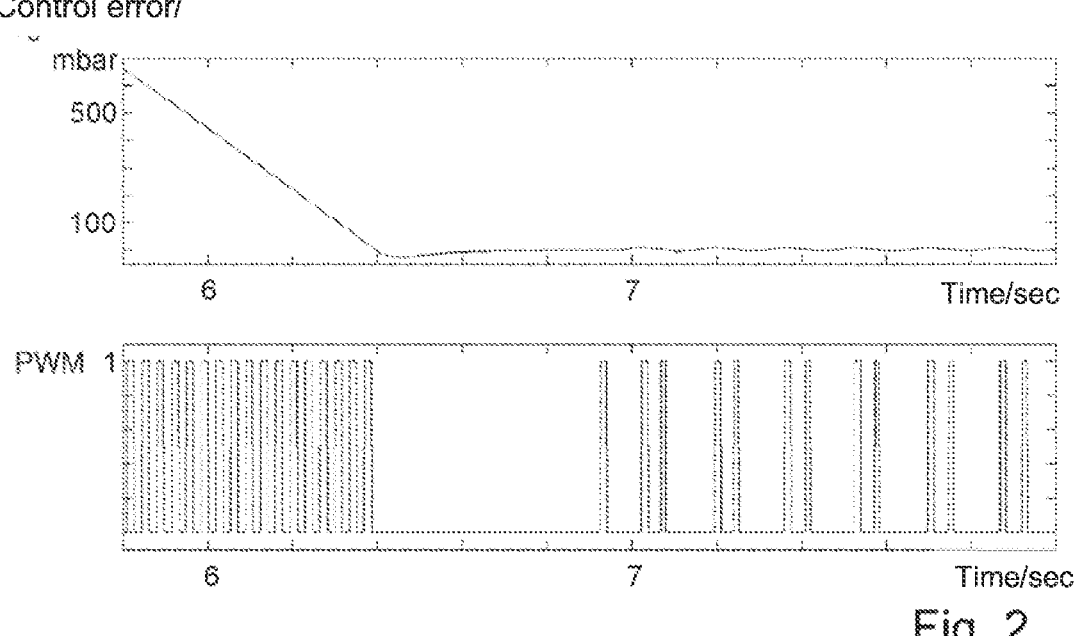
FIG. 2 shows a curve diagram for visualisation of the method explained in FIG. 1.
Figure 3:
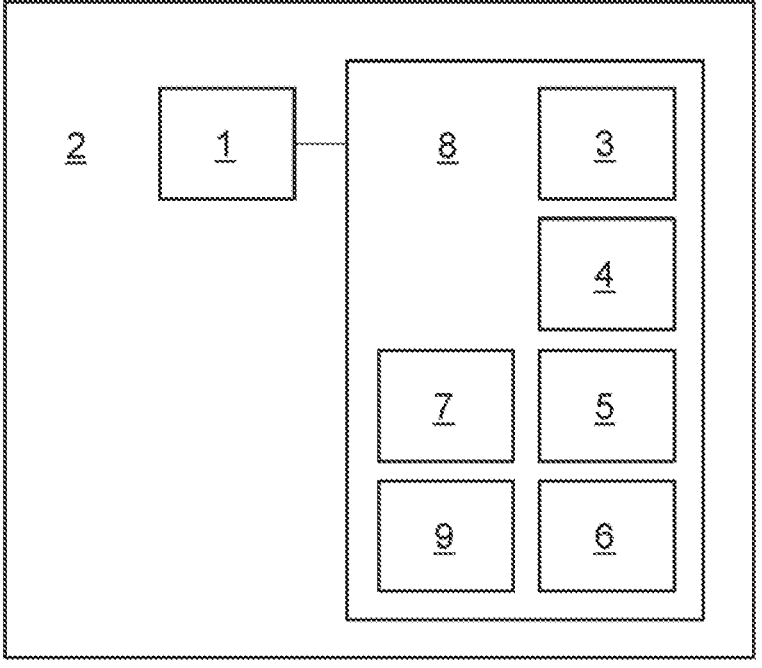
FIG. 3 shows a block diagram representing a fuel cell system according to the invention with a circuit arrangement and a computer program installed therein.

Elements with the same function and mode of action are each assigned the same reference signs in FIGS. 1 to 3.

FIG. 1 shows, schematically, a flowchart illustrating a method for setting an injection strategy for an injector 1 by way of PWM signals in order to inject fuel in a fuel cell system 2. The functional components for carrying out the method are shown in FIG. 3. According to a first step S1, an injection frequency is first set to a value of approx. 30 Hz with a pulse duration of approx. 17 ms or a duty cycle of approx. 50% in the PWM signal by means of a setting unit 3. These values, in particular the duty cycle or the pulse duration, are selected with a selection unit 7 on the basis of a lookup table with reference to the injection frequency and are set accordingly.

In a second step S2, the injection frequency is set to a second value of about 0.2 Hz by the adjusting unit 4, whereby the pulse duration of the PWM signal is kept constant and the duty cycle of the PWM signal is reduced accordingly to approx. 0.34%. A current pressure value in the anode section is hereby determined using a determining unit. A difference value between the determined current pressure value and a setpoint value is then generated by a generating unit 6. The injection frequency is then adjusted accordingly by the adjusting unit 4 on the basis of the generated difference value.

FIG. 2 shows the signal waveform of an exemplary PWM signal in correlation to a pressure loss in a fuel cell stack of the fuel cell system 2. More precisely, the pressure loss in the anode section of the fuel cell stack is shown in the upper section of FIG. 2, while the associated adjustment from a high injection frequency to a correspondingly lower injection frequency or the corresponding PWM signal is shown below. In the upper diagram of FIG. 2, the time in seconds is plotted on the X-axis and the control error in millibars is plotted on the Y-axis. In the lower diagram in FIG. 2, the time in seconds is again plotted on the X-axis and the PWM signal (dimensionless) is plotted on the Y-axis.

FIG. 3 shows a fuel cell system 2 in the form of a PEM fuel cell system with a circuit arrangement 8 for setting an injection strategy for an injector 1 of the fuel cell system by way of PWM signals in order to inject fuel in the fuel cell system 2. The circuit arrangement 8 has a setting unit 3 for setting an injection frequency to a predefinable first value within a predefinable value range with a predefinable pulse duration in the PWM signal, and an adjusting unit 4 for adjusting the injection frequency to a predefinable second value, different from the first value, within the predefinable value range, wherein the pulse duration of the PWM signal is kept constant in order to change a duty cycle of the PWM signal of the injection strategy.

The circuit arrangement 8 further comprises a determining unit 5 for determining a current pressure value in the anode section and a generating unit 6 for generating a difference value between the current pressure value and a setpoint value, wherein the adjusting unit 4 is configured to adjust the injection frequency on the basis of the generated difference value. Also, a selection unit 7 for selecting a predefinable duty cycle on the basis of a lookup table is provided for the PWM signal when setting the injection frequency to the first value. In addition, a computer program 9 is installed in the circuit arrangement 8 which comprises commands which, when the computer program 9 is run on a computer, for example in the form of the circuit arrangement 8 or a processing unit of the circuit arrangement, causes the latter to carry out the method described above or to set the injection strategy for the injector 1 accordingly by way of PWM signals in order to inject fuel in a fuel cell system 2.

In addition to the embodiments described, the invention allows for further design principles. That is to say, the invention should not considered to be limited to the exemplary embodiments explained with reference to the figures.

LIST OF REFERENCE SIGNS 1 injector
2 fuel cell system
3 setting unit

4 adjusting unit
5 determining unit
6 generating unit
7 selection unit
8 circuit arrangement
9 computer program

The invention claimed is:

1. Method for setting an injection strategy for an injector (1) by way of a PWM, Pulse Width Modulated, signals in order to inject fuel in a fuel cell system (2), having the steps of:

setting an injection frequency to a predefinable first value within a predefinable value range with a predefinable pulse duration in the PWM signal using a setting unit (3), wherein for the PWM signal, when setting the injection frequency to the predefinable first value, a predefinable duty cycle is selected using a selection unit (7) on the basis of a lookup table, adjusting the injection frequency to a predefinable second value, different from the predefinable first value, within the predefinable value range using an adjusting unit (4), wherein the predefinable pulse duration of the PWM signal is kept constant in order to change the predefinable duty cycle of the PWM signal of the injection strategy;

wherein the fuel cell system (2) has at least one fuel cell stack with an anode section and a cathode section and the method comprises the following steps:

determining a current pressure value in the anode section using a determining unit (5), generating a difference value between the current pressure value and a setpoint value using a generating unit (6), and adjusting the injection frequency on the basis of the generated difference value using the adjusting unit (4).

2. Method according to claim 1, characterised in that, for an adjustment of the injection frequency, at least one operating parameter of the fuel cell system (2) is determined which is taken into consideration in a quality and/or in a quantity of the adjustment of the injection frequency.

3. Method according to claim 1, characterised in that the injection frequency is set or adjusted to a value between 0.2 Hz and 30 Hz.

\*   \*   \*   \*   \*